US009785488B1

(12) United States Patent
Leita et al.

(10) Patent No.: US 9,785,488 B1
(45) Date of Patent: Oct. 10, 2017

(54) HEURISTICS-BASED PROTOCOL LABELING FOR INDUSTRIAL CONTROL SYSTEMS

(71) Applicant: Symantec Corporation, Mountain View, CA (US)

(72) Inventors: Corrado Leita, Mountain View, CA (US); Marc Dacier, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 15/188,429

(22) Filed: Jun. 21, 2016

Related U.S. Application Data

(62) Division of application No. 14/142,115, filed on Dec. 27, 2013, now Pat. No. 9,384,066.

(51) Int. Cl.
*G06F 9/54* (2006.01)
(52) U.S. Cl.
CPC .................................. *G06F 9/546* (2013.01)
(58) Field of Classification Search
None
See application file for complete search history.

(56) References Cited

U.S. PATENT DOCUMENTS

| 7,305,455 | B2 | 12/2007 | Lynch et al. | |
|---|---|---|---|---|
| 7,996,224 | B2 | 8/2011 | Bacchiani et al. | |
| 7,996,897 | B2 | 8/2011 | Ramarao et al. | |
| 8,732,320 | B2 | 5/2014 | Leshchiner et al. | |
| 9,384,006 | B2 | 7/2016 | Cao | |
| 9,384,066 | B1* | 7/2016 | Leita | G06F 9/54 |
| 2002/0078349 | A1* | 6/2002 | Marso | G06F 9/541 713/166 |
| 2005/0060317 | A1 | 3/2005 | Lott et al. | |
| 2006/0206525 | A1* | 9/2006 | Cousins | G06F 9/541 |
| 2007/0260740 | A1* | 11/2007 | Guan | G06F 9/45516 709/230 |
| 2009/0083381 | A1* | 3/2009 | Mully | G06F 15/16 709/206 |

(Continued)

OTHER PUBLICATIONS

Tammo Krueger, Hugo Gascon, Nicole Kramer, Konrad Rieck, "Learning stateful models for network honeypots", ACM CCS Workshop on Artificial Intelligence and Security 2012.

(Continued)

*Primary Examiner* — Tuan Dao
(74) *Attorney, Agent, or Firm* — Maschoff Brennan

(57) ABSTRACT

A method for learning aspects of messages in an industrial control system is provided. The method includes obtaining a plurality of messages. The method includes starting at a first message field, proceeding via recursion to each next message field, and identifying message values at that message field as constant when constant in messages in a group, as random when random in messages in a group, as length when expressive of a shared length of messages in a group, as opcode when correlated with a shared structure of messages in a group, and otherwise as parameter. The method includes subdividing message groups into subgroups according to the identified message values at that message field, with the recursion applied to each subgroup. A method and system for monitoring messages in an industrial control system is provided.

8 Claims, 6 Drawing Sheets

(56) References Cited

U.S. PATENT DOCUMENTS

2009/0089842 A1* 4/2009 Perry .................. H04W 72/005
                                                                 725/78

OTHER PUBLICATIONS

Weidong Cui, Vern Paxson, Nicholas Weaver, Randy Katz, "Protocol-Independent Adaptive Replay of Application Dialog", NDSS 2006.
Weidong Cui, Jayanthkumar Kannan, Helen Wang, "Discoverer: Automatic Protocol Reverse Engineering from Network Traces", Usenix Security 2007.
Corrado Leita, "SGNET: Automated protocol learning for the observation of malicious threats", PhD Thesis, 2005.
U.S. Appl. No. 15/188,429, filed Jun. 21, 2016, Heuristics-Based Protocol Labelling for Industrial Control Systems, Corrado Leita.

* cited by examiner

HEURISTICS-BASED PROTOCOL LABELING FOR INDUSTRIAL CONTROL SYSTEMS

BACKGROUND

Protection of industrial control systems (ICS) poses many challenges. Industrial control systems use an extensive variety of protocols, many proprietary, in network communication among devices of the control system. Many solutions for the protection of industrial control systems rely on direct knowledge of protocol formats. These solutions are typically not generalizable to proprietary protocols, except with a large amount of custom reworking. Protocol parsers with built-in programming for specific protocols fail in the face of unfamiliar or new protocols. Many vendors are not eager to share details on their protocols, and licensing contracts with vendors often include clauses aimed at preventing reverse engineering of the protocols. Protocol-aware approaches are thus generally costly and based on reverse engineering, and are not readily upgradable in situations involving addition of proprietary protocols. An alternative venue to protocol-aware approaches consists in protocol learning, a set of techniques that have been investigated in the research world as a way to infer the protocol formats in a fully or partially automated way. Protocol learning often relies on alignment techniques, but attempts to align messages, by looking for or inserting gaps within the message payloads in order to maximize byte-wise alignment, often fail in industrial control systems. This is because many of these industrial control systems have messages with binary protocols that lack recurring numbers of fixed bytes, e.g. spaces, used as separators in the message. As a result of these and other factors, many industrial control systems are left without or with only minimal protection against cyber-attacks or other forms of sabotage. It is within this context that the embodiments arise.

SUMMARY

In some embodiments, a method for learning aspects of messages in an industrial control system is provided. The method includes obtaining a plurality of messages. The method includes starting at a first message field, proceeding via recursion to each next message field, and identifying message values at that message field as constant when constant in messages in a group, as random when random in messages in a group, as length when expressive of a shared length of messages in a group, as opcode when correlated with a shared structure of messages in a group, and otherwise as parameter. The method includes subdividing message groups into subgroups according to the identified message values at that message field, with the recursion applied to each subgroup, wherein at least one method operation is executed through a processor.

In some embodiments, a method for monitoring messages in an industrial control system is provided. The method includes obtaining a message and determining whether the message matches a model, starting at a first message field, and proceeding via recursion to each next message field. The determining includes evaluating message values at all message fields of the message, and wherein the model includes at least one fixed byte value, at least one length field value representing a length of a message, and at least one opcode field value. The method includes indicating the message is an outlier in response to the determining showing noncompliance for the message relative to the model, wherein at least one method operation is executed through a processor.

In some embodiments, a message monitoring system is provided. The message monitoring system includes a memory and a communication port, configured to couple to a network of an industrial control system. The system includes at least one processor coupled to the memory and the communication port, the at least one processor configured to perform actions. The actions performed by the processor include obtaining a set of messages from the industrial control system. The actions include determining a shared message field sequence for each of a plurality of subsets of the set of messages, via recursion evaluation of message field values in each message from a first message field to each successive message field and via successive subdivision of the set of messages according to shared message field types as determined during the recursion evaluation of message field values. The actions include forming a model, based on the shared message field sequence for each of the plurality of subsets of the set of messages, wherein the model resides in the memory and receiving, subsequent to the forming of the model, a message from the network of the industrial control system, via the communication port. The actions include comparing the message from the network to the model and indicating an anomaly in response to nonconformance of the message from the network in the comparing to the model.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
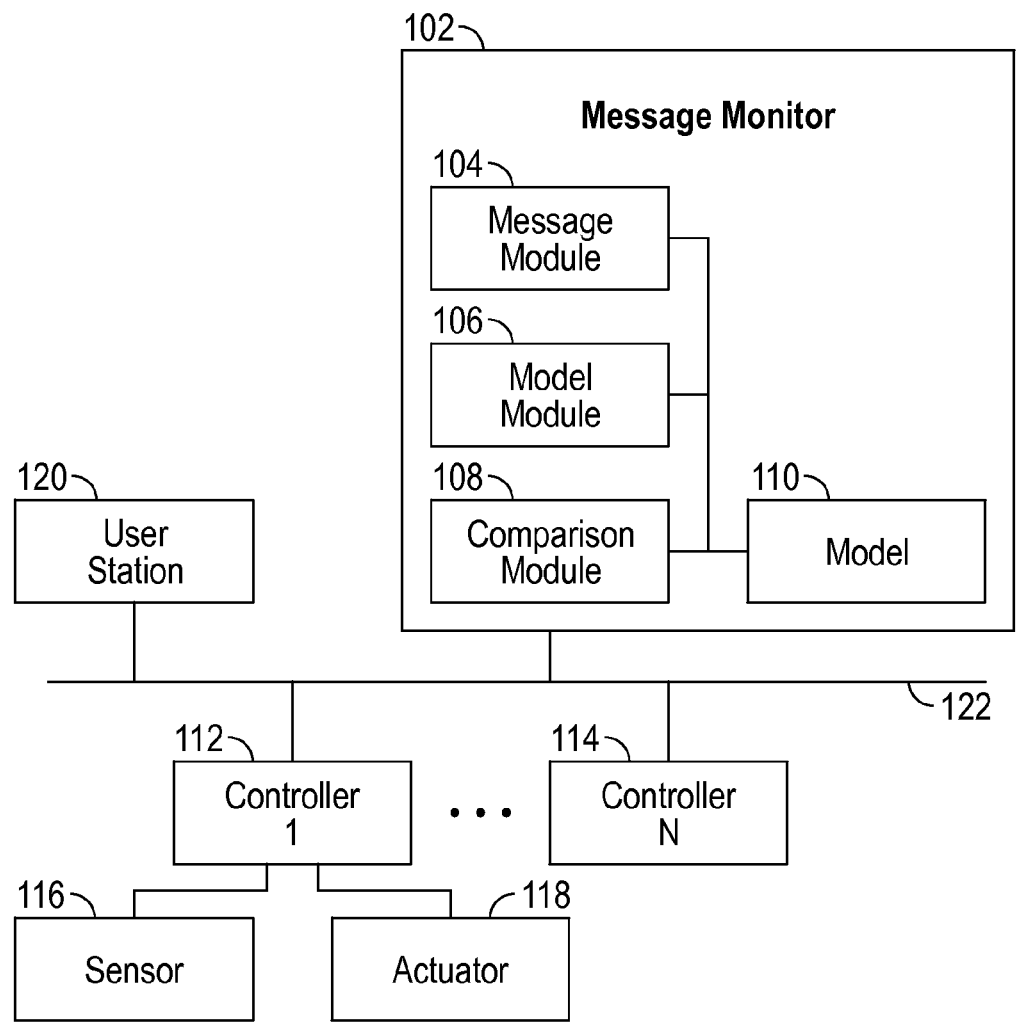
FIG. 1 is a block diagram of a message monitoring system, in accordance with some embodiments.

Embodiments of a message monitoring system, a method of learning aspects of messages, and a method for monitoring messages, as disclosed herein, provide solutions to the above-discussed challenges. By determining various parts of messages observed in an industrial control system or other system, embodiments can build a model for use as comparison, or can compare messages to a model. These determinations can reconstruct labeling information on network exchanges within a control system. Such labeling information can be instrumental to the creation of network whitelisting solutions for the protection of industrial control systems. The message monitoring system, employing such a network whitelisting solution, can provide an indication of anomalies to serve as warning against cyber attack, sabotage, or failure in the control system.

Embodiments, as discussed below with reference to FIGS. 1-5, provide a targeted solution for binary, compact and structured protocols typically observed in industrial control systems. A protocol in such a system is reconstructed by moving sequentially from the first byte of a message towards the last, and performing analysis on a large amount of protocol messages. By applying heuristics, values that hold special meaning for a parser are identified. Such values could include opcodes and length fields in messages. When applicable, the analysis is branched into subgroups associated to differing opcode values. This approach is significantly faster than state-of-the-art approaches for reconstruction of protocol structure, and obtains significantly better accuracy when dealing with the specific challenges offered by industrial control system protocols.

Many embodiments disclosed herein generate labeling information that can be used to discriminate among different message types pertaining to a specific industrial control system protocol. This objective is achieved by proceeding sequentially from the first byte or unit of a message until the end of each message, mimicking the operation of a protocol parser. A protocol parser would start from the beginning of a header, parsing field by field, obtaining information on the overall message length, and then would proceed to identify various opcodes according to a specification. Protocol parsers would then proceed to understand the semantics of the opcodes, again according to the specification. Embodiments disclosed herein do not presume access to a protocol specification, but instead proceed sequentially over the bytes of a large amount of messages, applying heuristics to identify bytes of particular relevance to an otherwise unknown (to the embodiments) protocol. By considering a large amount of messages, e.g., thousands or more, the embodiments can identify random bytes, e.g., transaction identifiers (IDs), and fixed bytes, i.e., those bytes whose value is fixed throughout some or all of the message samples. These bytes have validation semantics. It is expected for a well formed protocol message that the message will expose exactly the same value as messages seen in the training set.

Length fields, in the messages, are identified by interpreting a sequence of bytes, e.g. a character, a short sequence, or a word, as a numerical value, which could be encoded, e.g., in little endian or big endian in some embodiments. A linear dependence is identified between the decoded value and the length of the associated message. It should be appreciated that similar to fixed bytes, length fields have validation semantics and can be used to verify the correctness of a specific protocol message.

One challenge overcome through the embodiments described herein is that of correctly identifying bytes whose semantics has an influence on the overall structure of the protocol message. Opcodes assign specific semantics to the content of a given message, and allow for example, a standard reply of a programmable logic controller (e.g., containing the value of the programmable logic controller registers) to be distinguished from an error message that may be associated with a problem or an anomaly. Often, there is a correlation between an opcode value and an overall message length, since different opcodes carry different information and require a different number of bytes to carry this information. In some cases, a correlation has been identified between an opcode byte value and the role of a given device in a network, e.g., an opcode could be or include a source or destination Internet Protocol (IP) address. In many cases, certain devices, e.g., distributed control system servers, are only interested in generating read requests towards a control system, while control system devices are usually responding to such requests and providing the requested data, or sending data on a regular basis. All of these correlations between values of a given byte and the size of a message, or the involved endpoints can be discovered by leveraging a commonly accepted information theory measure, known as mutual information. Once an opcode byte is identified, the protocol inference is forked. In many embodiments, the sequential analysis of the subsequent bytes is recursively split into different sub-analyses, where the content of the messages as associated to different opcode values is analyzed separately. It should be appreciated that the term opcode, as used herein, has a more general meaning than opcodes specific to processors. For example, opcodes as determined in messages of a control system could include codes for requests for information, return of information, sources of information (e.g., the IP address of a sender of information), destinations of information (e.g., the IP address of an intended recipient of the information), requests of operations, verification of operations, status, and so on.

Parameters can also be identified in the messages in some embodiments. Values that do not belong in the above classes of opcodes, length fields, fixed bytes, or random bytes serving as transaction IDs, are likely to be message parameters, e.g., the value of registers or sensors read from a given programmable logic controller.

In many embodiments, the process starts from analysis of a set of training messages, and sequentially analyzes the nature of each byte in a message. Whenever an opcode is identified, the sequential analysis is branched recursively for the bytes following the opcode, and different opcode values are analyzed separately. In some embodiments, the outcome of the above process is the creation of a model, for example a decision tree. For such decision trees, the identified opcode bytes branch the decision tree in multiple sub-branches, and the interaction of a new message with this decision tree inherently labels the message, allowing the extraction of parameters.

FIG. 1 is a block diagram of a message monitoring system, in accordance with an embodiment of the present disclosure. In the message monitoring system, a message monitor 102 monitors messages seen on a network 122 of an industrial control system, or other system. Various controllers 112, 114 (e.g., Controller 1 through Controller N) send messages to each other, receive messages from a user station 120, and send messages to the user station 120, via the network 122, in the industrial control system. For example, the user station 120 could have a display showing status of sensors 116 and actuators 118 throughout the industrial control system. The controllers 112, 114 send update messages to the user station 120, perhaps on a regular basis, and/or in reply to inquiries from the user station 120. In a first phase of operation, the message monitor gathers messages from the industrial control system, and analyzes the messages. In a second phase of operation, the message monitor gathers further messages from the industrial control system, and compares the messages as to compliance or noncompliance.

The message monitor 102 can be implemented in various ways, such as with hardware, firmware, a processor executing software, or various combinations thereof. In the embodiment shown, the message monitor 102 includes a message module 104, a model module 106, a comparison module 108, and a model 110. The message module 104 receives messages from the network 122, i.e., from the control system via the network 122. For example, the message monitor 102 could include a communication port (not shown in FIG. 1, but see FIG. 5), which could be coupled to the network 122 so that the message monitor 102 can intercept messages. In a further embodiment, the message monitor 102 could be implemented as integrated into the user station 120, or integrated into one of the controllers 112, 114 or other component of the control system. In a still further embodiment, the message monitor 102 could be implemented as integrated into a network switch, a network router or other network component in the network 122. The message module 104 analyzes messages, in a manner further discussed regarding FIGS. 2-4B. In some embodiments, the message module analyzes the messages in a recursive manner, starting with the beginning of the message in proceeding one or multiple bytes at a time to the end of the message.

Still referring to FIG. 1, the model module 106 cooperates with the message module 104, and constructs the model 110, which could reside in a memory in the message monitor 102. In further embodiments, the model 110 could reside in a memory located elsewhere and coupled to the message monitor 102. Various types of models are further discussed with reference to FIGS. 3A-3C. Continuing with FIG. 1, the comparison module 108 cooperates with the message module 104, the model module 106, and the model 110, to compare further messages of the industrial control system against the model 110. The comparison module 108, in some embodiments, can issue an indication of an anomaly, e.g., a message that is an outlier and not in compliance with the model. This indication could come in the form of status, such as could be a displayed on the user station 120, a warning, or a direction, e.g. to shut down some or all of the equipment in the industrial control system or transition to a safe or an emergency procedure, etc. In further embodiments, some or all of the modules of the message monitor 102 are combined with one another in various combinations.

Figure 2:
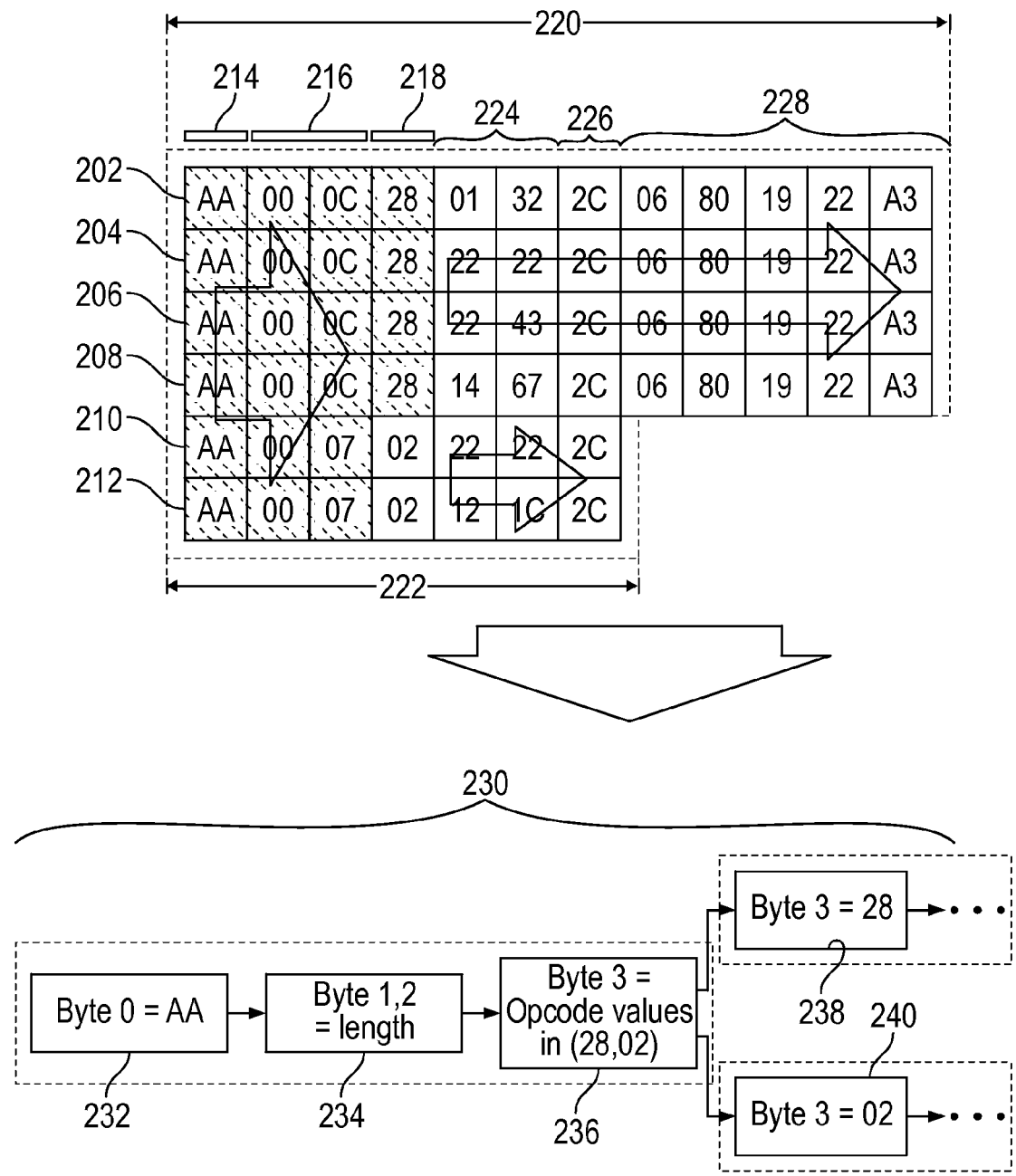
FIG. 2 is an analysis diagram showing fields in a plurality of messages from an industrial control system, as analyzed in the message monitoring system of FIG. 1, in accordance with some embodiments.

FIG. 2 is an analysis diagram showing fields in a plurality of messages 202, 204, 206, 208, 210, 212 from an industrial control system, as analyzed in embodiments of the message monitoring system of FIG. 1. It should be appreciated that, in various industrial control systems and other systems, wide varieties of formats, contents, lengths and other characteristics of messages are available. Nonetheless, the example shown in FIG. 2 serves to illustrate message analysis as practiced herein. Messages of two message lengths 220, 222 are shown in the example illustrated through FIG. 2. It should be further appreciated that these messages could have been gathered in an order other than shown here in other embodiments. In some embodiments, the messages are grouped according to length. Thus, the messages 202, 204, 206, 208 of message length 220 equal to twelve bytes (0C in hexadecimal) are grouped together, e.g., as a first group, as are the messages 210, 212 of message length 222 equal to seven bytes (07 in hexadecimal), e.g., as a second group.

Starting with the first byte of the message of FIG. 2, i.e., at the start of the message, messages can be grouped together according to various fields. These groupings can be tracked in various ways. In some embodiments, the byte fields of the messages are labeled, for example by setting indications in memory, for each message analyzed. In some embodiments, the contents of byte fields are tracked in memory, and a message identifier is added to a bin under the contents of a specified byte field. Various further tracking mechanisms are readily devised in accordance with the teachings disclosed herein. In the example shown, the first byte is identified as a fixed byte field 214, having a value in common across all of the messages. That is, all of the messages have the same, identical valued first byte. In further examples, one group of messages may have an identical first byte, and another group of messages may have another, differing, identical first byte, and so on. In still further examples, one group of messages may have an identical first byte, another group of messages may have a variable first byte, and so on.

Proceeding from the first byte, in the example shown, the second and third bytes are discovered to be a length field 216 of FIG. 2. This is determined by comparing a value of these two bytes to the value of the length of the message. When a value of a byte, or two bytes, etc. at a particular location in multiple messages correlates with the value of the length-in-common of these messages, these messages can be grouped together as having a same length and a same length field value, and that byte field declared or labeled a length field 216. For example, as shown in FIG. 2, the value of the length field 216 in the first group of messages 202, 204, 206, 208, namely "0C" (in hexadecimal, equals twelve in base ten), is the same in all of the messages in the first group, and is equal to the length of the message, namely twelve bytes. The value of the length field 216 in the second group of messages 210, 212, namely "07" (in hexadecimal, equals seven in base ten), is the same in all of the messages in the second group, and is equal to the length of the message, namely seven bytes. In further examples, the value of the length field 216 could be in binary coded decimal, or big endian or little endian, or other encodings. Heuristics may be applied to learn the encodings. In further examples, the length field 216 could be in differing locations in various groups of messages.

Proceeding from the length field 216, the next byte in the two groups of messages is discovered to be an opcode field 218. For example, in the first group of messages 202, 204, 206, 208, the value in the opcode field 218, namely the opcode value "28" hexadecimal, is the same in all of the messages in the first group, and the opcode field 218 is the next field after the length field 216. In the second group of messages 210, 212, the value in the opcode field 218, namely "02", is the same in all the messages of the second group, and the opcode field 218 is the next field after the length field 216. Since the length field 216 could be in differing locations in differing groups of messages, relative to the start of the message, so, too the opcode field 218 could be in different locations in differing groups of messages.

However, each group of messages has a common location of fixed byte field 214, length field 216, and opcode field 218, relative to the start of the message. It should be appreciated that each field can be one or more bytes in length.

Still referring to FIG. 2, once an opcode field 218 is identified, analysis splits. Each group of messages having a common (i.e., same or identical) fixed byte field 214 location and value, a common length field 216 location and value, and a common opcode field 218 location and value, is analyzed separately from other groups. Proceeding from the opcode field 218, the next two bytes in the first group of messages 202, 204, 206, 208 are discovered to be a variable byte field 224, i.e., a variable-valued byte field. This is because these two bytes vary in value said document across the messages in the first group. The next two bytes in the second group of messages 210, 212, after the opcode field 218, are discovered to be a variable byte field 224, because these two bytes vary across the messages in the second group. Proceeding from the variable byte field 224, the next six bytes in the first group of messages 202, 204, 206, 208 are discovered to be fixed byte fields 226, 228, because the values in these fixed byte fields 226, 228 are identical in all of the messages in the first group. The next byte in the second group of messages 210, 212, after the variable byte field 224, is discovered to be a fixed byte field 226, because the value in this fixed byte field 226 is identical in all of the messages in the second group.

In further examples, messages in a group of messages could have one or more variable byte fields, and/or one or more fixed byte fields, in various orders, following the opcode field. As with other types of fields, each field can be one or more bytes in length. In some embodiments, messages can be nested. In some embodiments a recursive application of an algorithm could determine further opcodes, and further fixed byte fields and/or variable byte fields in sub messages, i.e. messages nested within a message. Groups of messages having a common opcode in each group can be split into subgroups of messages having a further common opcode in each subgroup, and so on. For example, in nested messages, each nested message could have a length field and corresponding length field value that equals the length of that nested message, and an opcode correlated with the length of that nested message could be identified as having that property and a location that follows the length field. That is, the opcode could be identified by looking for a common value across a group of sub messages, in a field that is farther from the start of the message than the length field for that nested message.

The following is an example of pseudo code for an algorithm that can be applied in message analysis and heuristics-based protocol labeling for an industrial control system in some embodiments. This algorithm, or variations thereof, could be implemented in various computer programming languages, and compiled to form software that can be executed on a processor, in some embodiments. It should be appreciated that the pseudo code is not meant to be limiting as the pseudo code is one example for illustrative purposes. The pseudo code is presented below, followed by analysis of operation.

```
analyze(messages,index=0) {
    #messages is an array of all the messages we are currently analyzing
    #index is the current position we are looking at. By default, we start from position 0 (the leftmost byte)
    while index < messages.minimum_length( ) {
        values=messages.get_values(index)
        if all_constant(values)
            #all the messages have the same constant value at index
            mark_constant(index)
        else if all_random(values)
            #the values at position index are randomly distributed
            mark_random(index)
        else if is_length(values,messages,index)
            #there is a mathematical relation between the field value and the total message length
            mark_length(index)
        else if is_correlation(values,messages,index) {
            #there is a correlation between the field value and the overall structure/length of what comes next
            mark_opcode(index)
            #in this case, we continue the analysis by looking separately at each opcode value
            for opcode in values.get_distinct( )
                #we create a sub array containing only those messages whose value at position index is equal to opcode
                sub_messages=messages.partition(opcode,index)
                #notice: here we are calling the function recursively
                analyze(sub_messages,index+1)
                #the recursion has already done all the analysis job, we can stop
                return
        } else
            #this is a varying, non-random byte. It is likely to be a parameter
            mark_parameter(index)
            #certain fields may have a size different from one byte. A length field, for instance, may be 2 bytes long
            index+=compute_fieldsize(index)
    }
}
```

In the above pseudocode, each message in an array of messages is analyzed starting from position zero, the leftmost byte of the message, by recursive application of an analyze function (defined by the pseudocode). The index, which points to each position in a message during analysis of the message, starts at a value of zero and is later incremented to point to the next position. For example, each position in a message could be a byte field, starting with the leftmost byte and proceeding incrementally to the end of the message. While the index is less than the minimum length of all of the messages, the "values" function returns the value, in the portion of the message that is pointed to by the index. For example, during the first pass, the "values" function returns the value of the leftmost byte of the message, and in each subsequent pass, the "values" function returns the value of the next byte in the message, as pointed to by the index.

If this value is constant in all of the messages, at this index position, the value is marked constant at that index value. Otherwise, if this value is random in all of the messages, at this index position, the value is marked random at that index value. If this value evaluates according to a length function as equal to the length of the messages, the value is marked as a length at that index value. Otherwise, if this value is correlated with the overall structure or length of what comes next, the value is marked as an opcode at that index value.

Sub arrays are created in some embodiments. Each sub-array contains messages having the same opcode at the position index. Sub messages are created, by partitioning off from the original messages, at the index value. In other words, each of the sub messages starts after the portions of the message that have been looked at previously, and includes all of the remainder of the message. The analyze function is then called, and applied to the sub messages, starting with the incremented index. That is, the index is incremented, pointing to the next position in the message, and the analyze function is called for that position, as applied to the remainder of the messages.

Once the index equals the minimum length of the messages, the recursion in the analyze function ceases, and the function returns. A varying, non-random byte is marked as a parameter, at the index value. A compute field size function, applied at the index, computes sizes of fields, for example a length field which may be two bytes long. It should be appreciated that further functions could be applied herein, to mark constant parameters, random parameters, parameters centered at a nominal or stable value, i.e., a middle value, parameters having a discrete number of values less than, say, a threshold number of values or less than a maximum number of possible values for a field size, and so on. It should be further appreciated that the marking could come in the form of setting specified variables to specified values in memory, tracking in a database, adding or revising a portion of a model, or other format as readily devised. Models, and relationships of models to such markings and identifications, are further discussed with reference to FIGS. 3A-3C.

Continuing with reference to FIG. 2, the lower half of the diagram shows that, once an opcode is identified, the analysis (graphically represented with arrows) is split, so that analysis of all messages matching each opcode value is performed separately from analysis of messages matching each other opcode value. For example, a branching analysis 230 of the messages 202, 204, 206, 208, 210, 212 shows identification of a fixed byte field 232, followed by identification of a length field 234, followed by identification of an opcode field 236, followed by splitting of analysis for a first opcode field 238 and a second opcode field 240. The first opcode field 238 has a first opcode value, namely "28" hexadecimal, and the second opcode field 240 has a second opcode value, namely "02" hexadecimal. Messages grouped with the first opcode field 238 and associated value are analyzed together, and messages grouped with the second opcode field 238 and associated value are analyzed together. Each of these subgroups of messages may be further split as further opcodes are identified.

It should be appreciated that further variations of this pseudo code are readily developed in light of the teachings disclosed herein. Various groupings, subgroups, sets, subsets or other categorizations of messages can be arranged, as can various sub messages and splittings in the analysis. In further embodiments, heuristics can be added as plug-ins to a core module. For example, the core module could be implemented as software executing on a processor, and plug-ins could be implemented as additional software that can be executed on the processor in cooperation with the core module. Such plug-ins could extend the chain of "ifs" with capabilities to identify different types of fields.

Figure 3A:
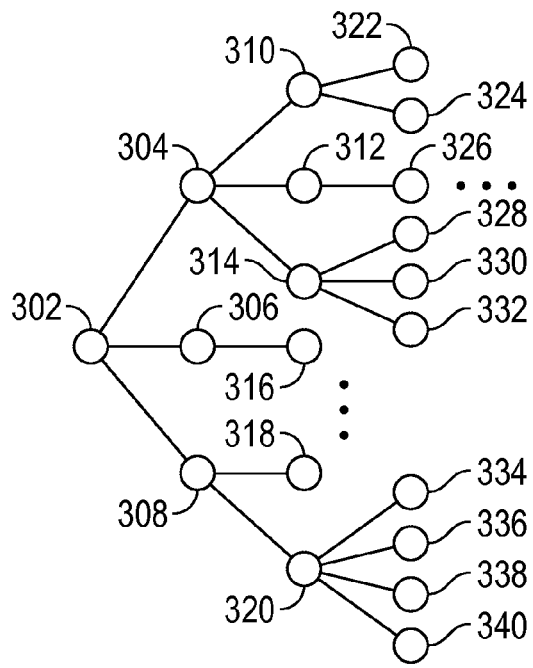
FIG. 3A is a model diagram showing an example of a message tree, which could be used by the message monitoring system of FIG. 1 in analysis of the messages of FIG. 2, in accordance with some embodiments.
Figure 3B:
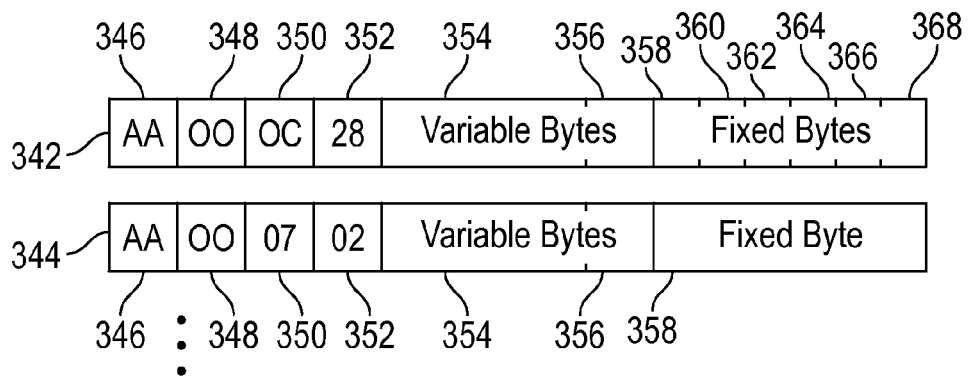
FIG. 3B is a model diagram showing an example of a plurality of message templates, which could be used by the message monitoring system of FIG. 1 in analysis of the messages of FIG. 2, in accordance with some embodiments.
Figure 3C:
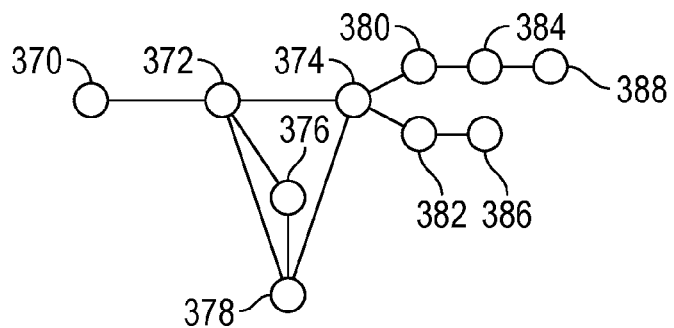
FIG. 3C is a model diagram showing an example of a state machine, which could be used by the message monitoring system of FIG. 1 in analysis of the messages of FIG. 2, in accordance with some embodiments.
Figure 4A:
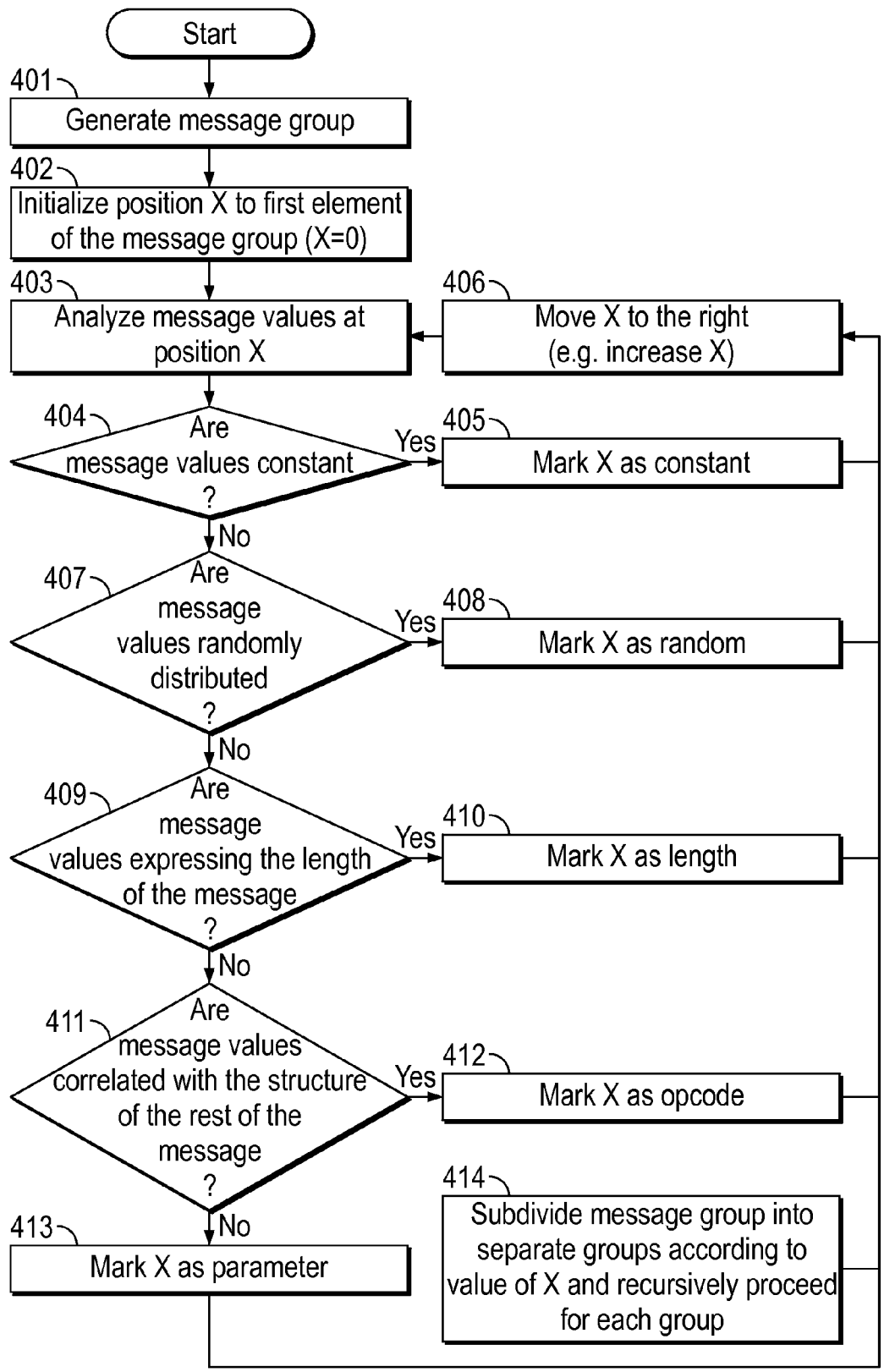
FIG. 4A is a flow diagram showing a method of learning aspects of messages, which can be practiced by the message monitoring system of FIG. 1, in accordance with some embodiments.
Figure 4B:
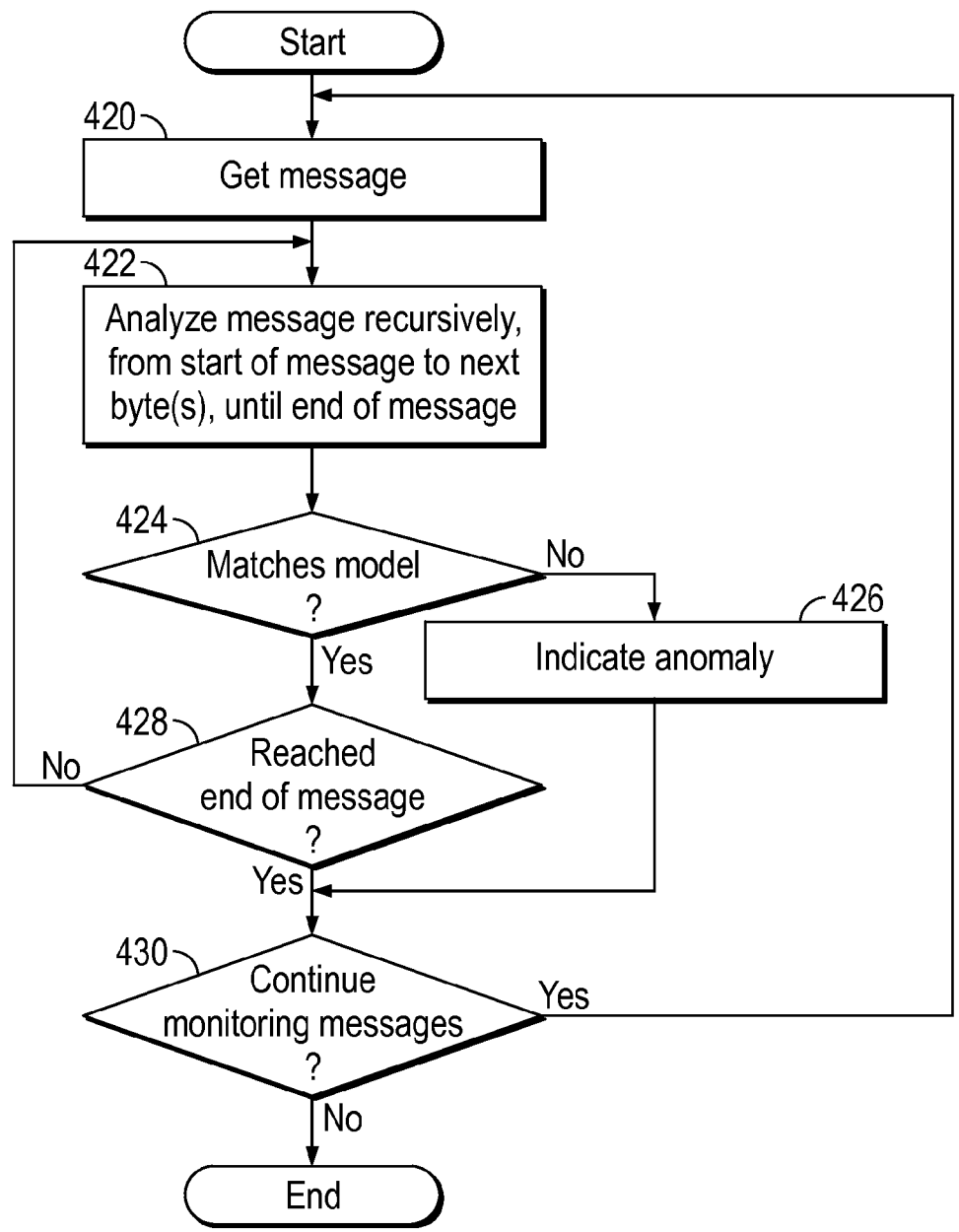
FIG. 4B is a flow diagram showing a method for monitoring messages, which can be practiced by the message monitoring system of FIG. 1, in accordance with some embodiments.

FIGS. 3A-3C show examples of various types of models which could be generated by the message monitoring system of FIG. 1 and/or application of the method shown in FIG. 4A, and applied to monitor messages in the message monitoring system of FIG. 1 and/or applications of the method shown in FIG. 4B, and embodiments thereof. Each of the models below is discussed generally and with an example applied to the analysis diagram and plurality of messages of FIG. 2. It should be appreciated that models, as developed and applied in a message monitoring system or in various methods and embodiments as disclosed herein, are not limited to the examples discussed below, and are not limited to applying to the specific messages shown in the example of FIG. 2. Further models, and various types of models, are readily devised in accordance with these teachings.

FIG. 3A is a model diagram showing an example of a message tree, which could be used by the message monitoring system of FIG. 1 in analysis of the messages 202, 204, 206, 208, 210, 212 of FIG. 2. The message tree includes various nodes 302, 304, 306, 308, 310, 312, 314, 316, 318, 320, 322, 324, 326, 328, 330, 332, 334, 336, 338, 340, which are developed in accordance with analysis of the messages in a training set, and which are traversed in accordance with analysis of further messages during monitoring. For example, one node 302 could indicate that all of the messages have a fixed byte value in common, at the start of the message, namely the fixed byte field 214 value of "AA" hexadecimal. From this node 302, the tree branches to three nodes 304, 306, 308, each of which represents a differing length field value. For example, node 304 could represent the length field value of "000C", as seen in the messages 202, 204, 206, 208 having an overall message length 220 of twelve bytes (i.e., the decimal value of "C" hexadecimal). Node 306 could represent the length field value of "0007", as seen in the messages 210, 212 having an overall message length 222 of seven bytes. Node 308 could represent some other length field value, seen in further messages of the training set. From node 306, the tree branches to just one node 316 which could represent an opcode field value of "02" as seen in the messages 210, 212. The dots in the diagram indicate further branchings could occur. From node 304, the tree branches to three nodes 310, 312, 314, each of which could represent opcode values. For example, the node 310 could indicate the opcode value of "28" hexadecimal, as seen in the messages 202, 204, 206, 208. Nodes 312, 314 could represent further opcodes seen in further messages of the training set. From the node 310, the tree branches to nodes 322, 324 which could represent variable byte fields or fixed byte fields. For example, the node 322 could indicate the variable byte field 224 having various values as seen in messages 202, 204, 206, 208. Still further branchings in further nodes could represent further fixed byte fields or variable byte fields, or further length fields, further opcode fields and so on.

In the context of the model shown in FIG. 3A, the identification and/or marking of the fields and the values in the fields in a grouping of messages can be embodied in the assignment of characteristics to each node in the message tree. The message tree could be embodied in various formats in a computer memory, as readily devised. Comparison of each portion of a message in succession from the start of the message, to the message tree, i.e., to the model embodied in the message tree, can be performed by transitioning from one node to the next in accordance with the value of the portion of the message. An anomaly is identified when this comparison process shows a value in a portion of a message for which there is no branch or node applicable for transitioning, in the message tree. In other words, during comparison of a message to a determined model represented in a message tree, when the message has a next portion value that is not represented as a possible transition from one node to another node in the determined model, the message does not conform to the model. Nonconformance of a message to the model is thus an anomaly.

FIG. 3B is a model diagram showing an example of a plurality of message templates 342, 344, which could be used by the message monitoring system of FIG. 1 in analysis of the messages 202, 204, 206, 208, 210, 212 of FIG. 2. Where a training set of messages would have a much larger number of messages then shown in FIG. 2, the set of message templates in a model would have a larger number as well. The mapping of messages in a training set to templates is many-to-one. That is, each group of messages maps to a corresponding template, with the number of templates equal to the number of groups, in some embodiments. Here, the messages 202, 204, 206, 208 having in common a same fixed byte field 214 value, a same length field 216 value, and a same opcode field 218 value, are mapped to a first template 342. This template 342 indicates a first field 346 has a fixed byte value of "AA", a second field 348 has a fixed value of "00", a third field 350 has a fixed value of "0C" hexadecimal, identified as a length field value, a fourth field 352 has a fixed value of "28" hexadecimal, identified as an opcode field value, a fifth field 354 and a sixth field 356 have various values and are collectively identified as a variable byte field, a seventh field 358, an eighth field 360, a ninth field 362, a tenth field 364, an eleventh field 366, and a twelfth field 368 have a fixed value each, and are collectively identified as a fixed byte field. The messages 210, 212 having in common a same fixed byte field 214 value, a same length field 216 value, and a same opcode field 218 value, are mapped to the second template 344. This template 344 indicates a first field 346 has a fixed byte value of "AA", a second field 348 has a fixed value of "00", a third field 350 has a fixed value of "07", identified as a length field value, a fourth field 352 has a fixed value of "02", identified as an opcode field value, a fifth field 354 and a sixth field 356 have various values and are collectively identified as a variable byte field, and a seventh field 358 has a fixed value and is identified as a fixed byte field.

In the context of the model shown in FIG. 3B, the identification and/or marking of the fields and the values in the fields in a grouping of messages can be embodied in the assignment of values and characteristics to each cell in each template. The templates could be embodied in various formats in a computer memory, as readily devised. Comparison of each portion of a message in succession from the start of the message, to the templates, i.e., to the model embodied in the templates, can be performed by transitioning from one cell in each template to the next in accordance with the value of the portion of the message. An anomaly is identified when this comparison process shows a value in a portion of a message for which there is no match in any of the templates in the set of templates. For example, if a message being analyzed, during monitoring, has a value at some position and none of the templates has the same value or type of value at the same position, the message does not conform to the model. A message may match, from the start of the message, some fixed bytes, but have a length field value which none of the message templates has. Or, the message may match, from the start of the message, fixed bytes and a length field value but have an opcode that none of the message templates has. The message may match, from the start of the message, fixed bytes, a length field value, an opcode field value, and have a value in a variable byte field that matches the range shown in the template, but have a differing value from what should be in a fixed byte field according to templates. Nonconformance of a message to the templates, i.e. no match of the message to any of the templates in a model, is thus an anomaly.

FIG. 3C is a model diagram showing an example of a state machine, which could be used by the message monitoring system of FIG. 1 in analysis of the messages 202, 204, 206, 208, 210, 212 of FIG. 2. The state machine has various states 370, 372, 374, 376, 378, 380, 382, 384, 386, 388 and transitions between the states, which are developed in accordance with analysis of the messages in a training set, and which are traversed in accordance with analysis of further messages during monitoring. In one type of model, each state represents the transmission of a next byte in a message. For example, one state 370 could indicate transmission of a first fixed byte in a message, e.g., of value "AA" as seen in FIG. 2. After transmission of the first byte, the state machine transitions to the second state 372, which indicates transmission of a second fixed byte in the message, e.g., of value "00". After transmission of the second byte, the state machine transitions to one of three states 374, 376, 378. The state 374 could indicate transmission of a length field value, while the state 376 indicates transmission of a further fixed byte and the state 378 indicates transition of a variable byte. Depending on the value of the length field transmitted in the state 374, the state machine could transition to one of the states 380, 382. If the length field value transmitted is "0C", the state machine could transition from the state 374 to the state 380. If the length field value transmitted is "07", the state machine could transition from the state 374 to the state 382. The state 380 could indicate transmission of an opcode field value, such as "28" hexadecimal. The state 382 could indicate transmission of an opcode field value, such as "02". From the state 380, the state machine could transition to the state 384, which indicates transmission of a variable byte, followed by a transition to state 388 to transmit another variable byte, and so on. From the state 382, the state machine could transition to the state 386 which could indicate transmission of a variable byte, and so on. Further branchings and further states could represent further transmissions of further field values. Various types of state machines and interpretations of states and transitions are readily devised in accordance with the teachings herein.

In the context of the model shown in FIG. 3C, the identification and/or marking of the fields and the values in the fields in a grouping of messages can be embodied in the assignment of characteristics to each state, or transition between states, in the state machine. The state machine could be embodied in various formats in a computer memory, as readily devised. Comparison of each portion of a message in succession from the start of the message, to the state machine, can be performed by transitioning from one state to the next in accordance with the value of the portion of the message. An anomaly is identified when this comparison process shows a value in a portion of a message for which there is no transition or state applicable for transitioning, in the state machine model. In other words, during comparison of a message to a determined model represented in a state machine, when the message has a next portion value that is not represented as a possible transition from one state to another state in the determined model, the message does not conform to the model. Nonconformance of a message to the model is thus an anomaly.

FIG. 4A is a flow diagram showing a method of learning aspects of messages, which can be practiced by the message monitoring system of FIG. 1. In various embodiments of the method, actions could be performed separately or in combination with other actions, and in various orders, as discussed in examples below.

From a start point, messages are collected and message groups are generated, in an action 401. For example, the messages can be collected from a network of an industrial control system or other system. These messages are a training set of messages. In some embodiments, the messages are grouped by length and this is intrinsic as part of the analysis of the messages, e.g., from labeling, in other embodiments, this action is performed explicitly. The method advances to operation 402 where position X is initialized to the first element to the message group. The messages are analyzed recursively, from the start of the message to the next byte or bytes, until the end of the message, as described in more detail below. For example, the message analysis could be performed by applying analysis recursively from the start of the message to successive bytes. In some embodiments, each message is analyzed recursively, followed by analysis of the next message. In a further embodiment, the messages are analyzed in parallel processing.

In an action 403, the message value at position X is analyzed. In decision action 404 it is determined if the message values are constant. If it is determined that the message value at position X for each of the messages of the group are constant in operation 404, the method advances to operation 405 where X is marked as a constant. The method then advances to operation 406 where position X is incremented or increased, e.g., moved to the right one position. The method returns to operation 403 and repeats as described herein. If it is determined in operation 404 that the message value at position X for each of the messages of the group are not constant, the method advances to operation 405 where it is determined if the message values are randomly distributed. If the message values are randomly distributed across the messages of the group, the method moves to operation 408 where position X is marked or recorded as random. The method then proceeds to operation 406 where position X is incremented or increased, e.g., moved to the right one position, and repeats as described herein. If it is determined that the message values are not randomly distributed across the messages of the group, the method moves to operation 409 where it is determined if the message values express the length of the messages of the group of messages. If the message value expresses the length of the message then position X is marked or recorded as the length in operation 410. The method then proceeds to operation 406 where position X is incremented or increased, e.g., moved to the right one position, and repeats as described herein. If it is determined that the message value does not express the length of the messages the method advances to operation 411 where it is determined if the message values are correlated with the structure of the remainder of the message. If the message value at position X are correlated with the structure of the remainder of the messages than the value at position X is marked or recorded as an opcode in operation 412.

From operation 412, the method advances to operation 414 where the message group is subdivided into separate groups according to the value of X and recursively proceeds for each group. For example, messages having the same message length and the same fixed bytes from the start of the message may be grouped together in some embodiments. This grouping could be explicit, e.g., through organization of messages in a memory, or could be implicit, e.g., through labeling of portions of the messages. In some embodiments, the message could successively identify one or more fixed bytes, a length field having a value that equals the length of the message, and an opcode field having an opcode value that is the same throughout the subgroups or re-groupings performed at this stage. From operation 414 the method moves to operation 406 where position X is incremented or increased, e.g., moved to the right one position, and repeats as described herein. If in operation 411 it is determined that the message value at position X is not correlated with the structure of the remainder of the messages then the value at position X is marked or recorded as a parameter in operation 413. The method then proceeds to operation 406 where position X is incremented or increased, e.g., moved to the right one position, and repeats as described herein. It should be appreciated that a model may be constructed based on the groups of messages, the varying value byte fields, and the constant value byte fields. Examples of models, and development and application of models, are shown in FIGS. 3A-3C. The model could be constructed as part of the identification or learning process, or could be constructed afterwards.

FIG. 4B is a flow diagram showing a method for monitoring messages, which can be practiced by the message monitoring system of FIG. 1. In some embodiments, the flow of FIG. 4B is preceded by the flow of FIG. 4A, so that the flow of FIG. 4B applies to the model produced in the flow of FIG. 4A. In various embodiments of the method, further actions could be performed to complete a specified action, as discussed in examples below.

From a start point, a message is gotten, in an action 420. For example, a message could be obtained from a network of an industrial control system, or other system to be monitored. Messages could be obtained one at a time, or in parallel, or in batch or bulk, and could be analyzed one at a time, or in parallel in further embodiments.

The message is analyzed recursively, in an action 422, from the start of the message to the next byte or bytes, until the end of the message. For example, analysis could be applied to the first byte of the message then recursively apply to the next byte of the message, until the end of the message is reached. At each iteration of the recursive analysis a portion of the message as pointed to by an index could be compared to an appropriate corresponding portion of a model, such as a branch, a node, a state, a transition, a portion of a template, and so on.

In a decision action 424, it is determined if the analysis shows that the message matches the model. If the answer is no, the analysis does not show that the message matches the model, the flow branches to the action 426, in which the anomaly is indicated. If the answer is yes, the flow branches to the action 428. For example, since this question of action 424 is asked during the recursive analysis of the message, a determination can be made for a present value of an index applied in the recursive analysis. The answer to the question of action 424 can be determined by examining whether there is a next node, state, branch, portion of a template or other portion of a model to which to transition, or a proper transition path in the model, in accordance with the value in the portion of the message as pointed to by the index.

In the decision action 428, a question is asked, has the analysis reached the end of the message? If the answer is no, the end of the message has not been reached, and flow branches back to the action 422, in order to continue the recursive analysis of the message. If the answer is yes, the end of the message has been reached, and flow branches to the decision action 430. For example, if the message matches the model at each increment of the index, and the end of the message is reached, it can be concluded that the entire message matches the model.

In the decision action 430, a question is asked, should the monitoring of messages continue? If the answer is yes, the flow branches back to the action 428, to get another message. If the answer is no, the flow branches to the endpoint. In further embodiments, the flow could branch elsewhere, for example to produce a status report, build a new model, or revise the model.

Figure 5:
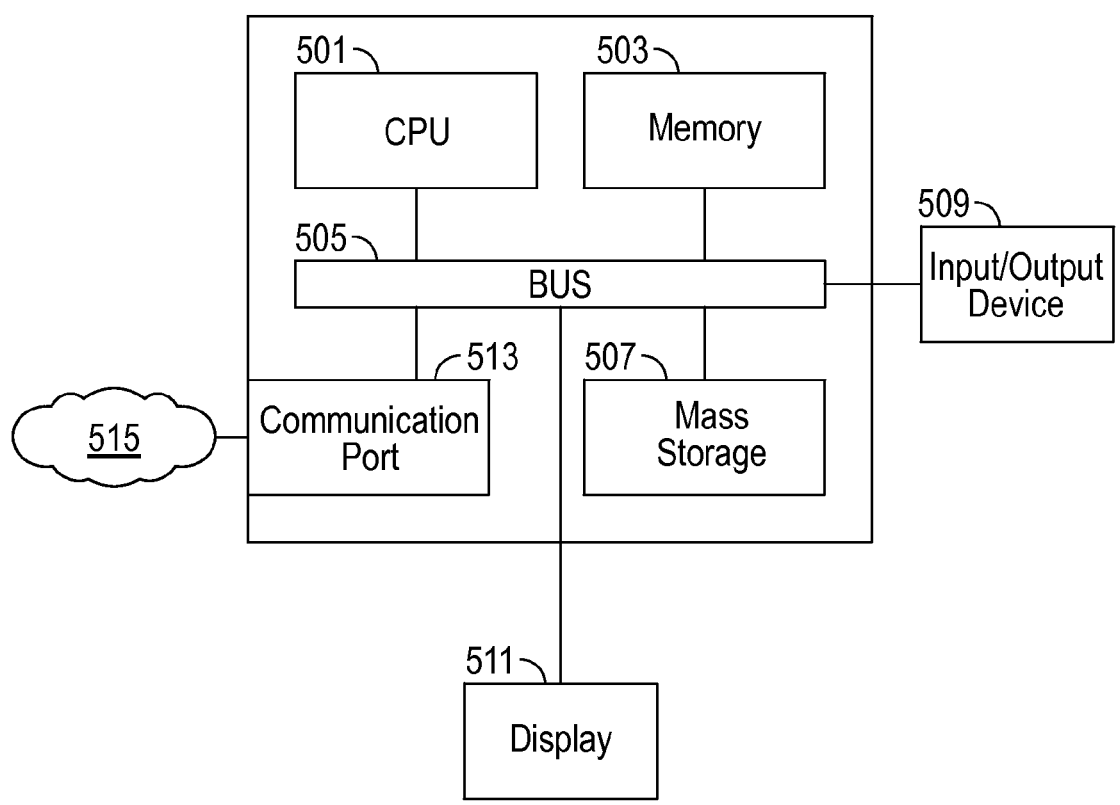
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for learning aspects of messages, protocol labeling, analysis of messages, and message monitoring, as in accordance with some embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. The computing device includes a communication port 513 coupled to the bus 505, in some embodiments. The communication port can be coupled to a network 515. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for learning aspects of messages in an industrial control system, comprising:
   obtaining a plurality of messages;
   starting at a first message field, proceeding via recursion to each next message field, identifying message values at that message field,
   the identifying comprising:
      analyzing the message values to find a constant, first shared value at that message field in the messages in the group, and marking the message values at that message field in the messages in the group as constant;
      analyzing the message values to find a second shared value, at that message field in the messages in the group, which evaluates as the shared length of the messages in the group, and marking the message values at that message field in the messages in the group as length;
      analyzing the message values to find a third shared value, at that message field in the messages in the group, which correlates with the shared structure of the messages in the group, and marking the message values at that message field in the messages in the group as opcode; and
   subdividing message groups into subgroups according to the identified message values at that message field, with the recursion applied to each subgroup, wherein at least one method operation is executed through a processor.

2. The method of claim 1, wherein the message values identified in the messages in the group as to constant, length, and opcode, are in a same message field position relative to a start of each message in the group, for each type of message value in the group.

3. The method of claim 1, further comprising:
   generating a model, based upon the subgroups and the identified message values; and
   comparing at least one further message to the model, wherein a result of the comparing indicates compliance or noncompliance.

4. The method of claim 1, wherein identifying message values at that message field includes:
   analyzing the message values to find random values at that message field in the messages in the group, and marking the message values at that message field in the messages in the group as random; and
   marking the message values at that message field in the messages in the group as parameter, in response to a determination that the message values at that message field in the messages in the group are none of constant, random, length, nor opcode.

5. The method of claim 1, wherein the identifying message values includes recursive application of analysis to each of the plurality of messages, beginning with a start of each message.

6. The method of claim 1, further comprising:
   obtaining a further plurality of messages; and
   updating a model that is based on the plurality of messages, responsive to application of heuristics on the further plurality of messages.

7. The method of claim 1, further comprising:
   identifying whether message values identified as parameter at a message field in a group of messages are one from a set consisting of: random, centered about a nominal value, and a number of discrete values less than a threshold number of discrete values.

8. The method of claim 1, further comprising:
   generating a model based on the subgroups, wherein the model includes at least one from a group consisting of: branches, a tree, templates, nodes, states, and transitions.

* * * * *